United States Patent [19]
Sasaki et al.

[11] Patent Number: 4,612,363
[45] Date of Patent: Sep. 16, 1986

[54] PROCESS FOR THE PRODUCTION OF POLYESTER

[75] Inventors: Isao Sasaki; Hiroshi Mori; Masaharu Fujimoto, all of Hiroshima, Japan

[73] Assignees: Mitsubishi Rayon Co., Ltd.; Research Association for Synthetic Fiber Technology, both of Japan

[21] Appl. No.: 799,758

[22] Filed: Nov. 19, 1985

[30] Foreign Application Priority Data

Nov. 20, 1984 [JP] Japan ................................ 59-243378

[51] Int. Cl.$^4$ ........................ C08G 63/04; C08G 63/22
[52] U.S. Cl. ................................ 528/274; 528/308.1; 528/308.3; 528/483; 528/501
[58] Field of Search ................. 528/274, 308.1, 308.3, 528/483, 501

[56] References Cited

U.S. PATENT DOCUMENTS

| | | | |
|---|---|---|---|
| 4,161,578 | 7/1979 | Herron | 528/308.3 X |
| 4,205,157 | 5/1980 | Dutt | 528/483 X |
| 4,289,871 | 9/1981 | Rowan et al. | 528/483 X |
| 4,360,661 | 11/1982 | Horlbeck et al. | 528/274 X |
| 4,374,975 | 2/1983 | Dutt | 528/483 X |
| 4,387,213 | 6/1983 | Horlbeck et al. | 528/483 X |
| 4,532,319 | 7/1985 | Wendling | 528/274 |

Primary Examiner—Lucille M. Phynes
Attorney, Agent, or Firm—Sughrue, Mion, Zinn, Macpeak and Seas

[57] ABSTRACT

A process for the production of polyester comprising at least 80% of an ethylene terephthalate repeating unit using as a starting material an ester compound made mainly of terephthalic acid and ethylene glycol or an oligomer thereof is disclosed. This process is characterized in that a prepolymer having an intrinsic viscosity of not more than 0.4 dl/g and a carboxyl terminal group concentration [COOH] of not more than $90 \times [\eta]^{-0.4}$ μeq/g is fed to a final polymerization unit and polymerized in the form of a molten thin film having a thickness of from 0.005 to 0.15 mm.

9 Claims, 2 Drawing Figures

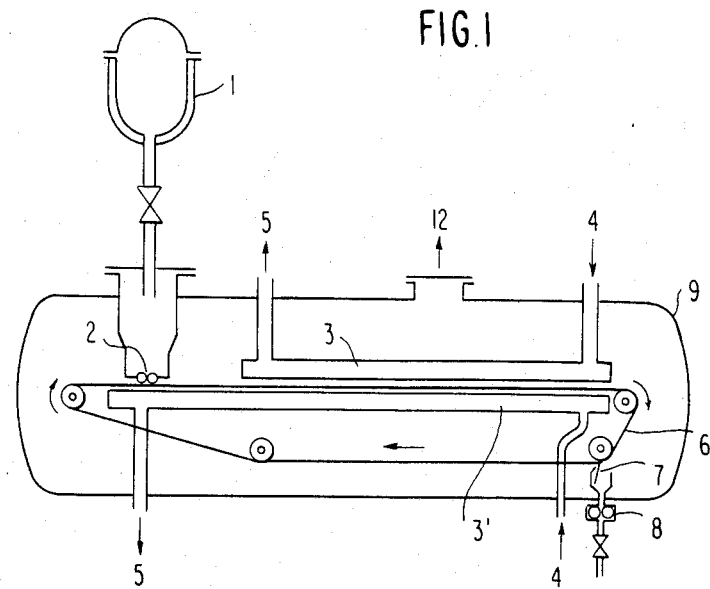
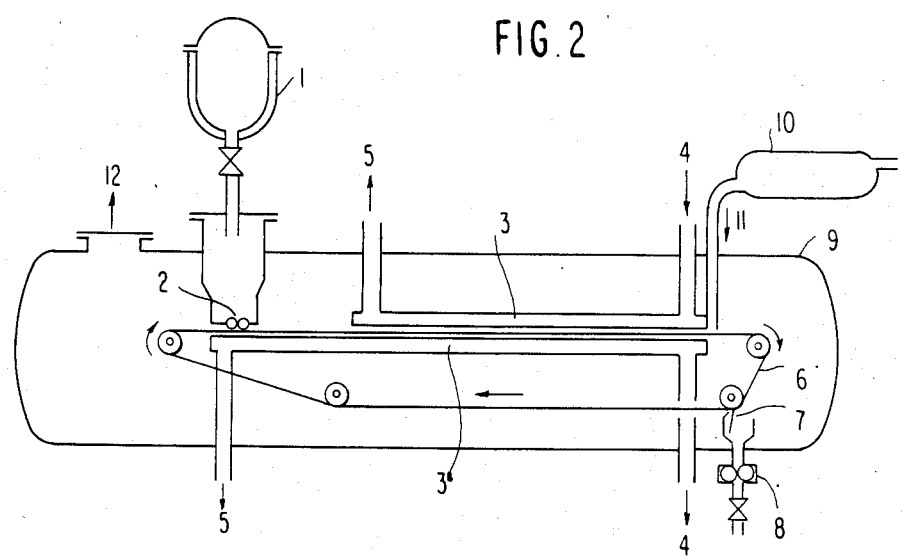

PROCESS FOR THE PRODUCTION OF POLYESTER

FIELD OF THE INVENTION

The present invention relates to a process for the production of polyester. More particularly, the present invention relates to a process for rapid polymerization of polyester which comprises melt polycondensing a polyester starting material having a specific carboxyl terminal group concentration in the form of a thin film having a specific thickness.

BACKGROUND OF THE INVENTION

Polyester, and particularly polyethylene terephthalate, is widely used as a material for production of fibers and films, or as a molding material, and its industrial value is quite high. For such a molding material or industrial fibers, a polyester is required having a high degree of polymerization. As a process for the production of polyester, the batch polymerization method, the continuous polymerization method, and so forth are known as described in *Seni Binran* (Fiber Handbook), published by Maruzen Co., Ltd., (Nov. 30, 1968). These conventional methods, however, have disadvantages in that a long time is needed for polymerization, and it is quite difficult to produce polyester having an intrinsic viscosity $[\eta]$ of at least 0.8 dl/g on a commercial scale.

As a method to increase the rate of polymerization of polyester, a method is known in which BHET (bishydroxyethyl terephthalate) or an oligomer thereof is sent to a heating zone in the form of a thin film having a thickness of from 0.026 to 0.3 mm by the use of an endless metallic belt and is subjected to a polycondensation to produce polyester, as described in Japanese Patent Publication No. 5119/73. This method is limited in its ability to shorten the time for polymerization, and requires at least thirty minutes in the production of polyester having such a degree of polymerization that the intrinsic viscosity is not less than 0.8 dl/g.

SUMMARY OF THE INVENTION

The present invention relates to a process for producing polyester comprising at least 80% of an ethylene terephthalate repeating unit using as a starting material an ester compound made mainly of terephthalic acid and ethylene glycol or an oligomer thereof, which process is characterized in that an oligomer having an intrinsic viscosity $[\eta]$ of not more than 0.4 dl/g and a carboxyl terminal group concentration [COOH] of not more than $90 \times [\eta]^{-0.4}$ μeq/g is fed to a final polymerization reactor and polymerized in an inert gas stream or under reduced pressure in the form of a molten thin film having a thickness of from 0.005 to 0.15 mm.

BRIEF DESCRIPTION OF THE DRAWINGS

FIG. 1 is a longitudinal cross-sectional view of an embodiment of an apparatus for use in polymerization under reduced pressure according to the present invention; and FIG. 2 is a longitudinal cross-sectional view of an embodiment of an apparatus for use in polymerization in an inert gas stream according to the present invention, wherein the numeral 1 indicates a tank of the starting material, 2 indicates a roller, 3 indicates a heating plate, 4 indicates an inlet, 5 indicates an outlet, 6 indicates an endless metallic belt, 7 indicates a scraper, 8 indicates a gear pump, 9 indicates a reactor unit, 10 indicates an inert gas heater, 11 indicates an inert gas inlet pipe, and 12 indicates a discharge outlet.

DETAILED DESCRIPTION OF THE INVENTION

In accordance with the process of the present invention, an oligomer having the above-specified carboxyl terminal group concentration and intrinsic viscosity is polymerized in the form of a molten thin film having a thickness falling within the above-specified range, whereupon polyester having a high intrinsic viscosity can be obtained in a short time.

The desired polyester of the present invention is obtained by subjecting a mixture of terephthalic acid or dimethylterephthalate, ethylene glycol, and, if desired, a third component, to an esterification or ester interchange reaction, and then to a polycondensation reaction.

As the third component, bifunctional monomers such as isophthalic acid, phthalic acid, adipic acid, sebacic acid, propylene glycol, neopentyl glycol, tetramethylene glycol, 1,4-cyclohexanedimethanol, p-oxybenzoic acid, and p-oxyethoxybenzoic acid, polyfunctional cross-linking agents such as trimethylolpropane, pentaerythritol, glycerine, and trimellitic acid, monofunctional terminators such as monomethoxypolyethylene glycol and naphthoic acid, and so forth can be used. In addition, other types of polymers such as polystyrene and a styrene-methyl methacrylate copolymer, pigments such as carbon black and titanium oxide, ultraviolet absorbers, fluorescent whitening agents, insoluble nucleating agents such as kaolin, and so forth can be used.

For the oligomer to be fed to the final polymerization reactor, the intrinsic viscosity $[\eta]$ is not more than 0.4 dl/g and preferably from 0.1 to 0.4 dl/g, and the carboxyl terminal group concentration [COOH] is not more than $90 \times [\eta]^{-0.4}$ μeq/g, and preferably not more than $20 \times [\eta]^{-0.4}$ μeq/g. The intrinsic viscosity as used herein is a value measured at 25° C. in a mixed solvent of equal volume of phenol and tetrachloroethane. The carboxyl terminal group concentration [COOH] is a value measured by the Pohl's method described in *Analytical Chemistry*, Vol. 20, page 1614 (1954).

To produce an oligomer having an intrinsic viscosity $[\eta]$ of more than 0.4 dl/g, a complicated polycondensation reactor is needed, or it is necessary to connect a number of polycondensation reactors in a series. This is disadvantageous from an economic standpoint, and from the standpoints of stability of the process and so forth. On the other hand, if the intrinsic viscosity $[\eta]$ is less than 0.1 dl/g, the capability of the final polymerization reactor is exhibited only insufficiently, and it is necessary to increase the amount of the inert gas supplied. Thus this is disadvantageous from the standpoint of efficiency.

If the carboxyl terminal group concentration [COOH] is more than $90 \times [\eta]^{-0.4}$ μeq/g, a polymer having a high intrinsic viscosity cannot be obtained.

In the practice of the present invention, the above oligomer is reacted in an inert gas stream or under reduced pressure in a polymerization reactor.

The reaction temperature is preferably from 240° to 330° C. If the reaction temperature is lower than 240° C., the reaction time is undesirably lengthened. On the other hand, if the reaction temperature is higher than 330° C., the polymer is colored through thermal decomposition. The film thickness of the prepolymer is adjusted to from 0.005 to 0.15 mm. Even if the film thickness is decreased to less than 0.005 mm, the reaction time is not shortened and, furthermore, since the processing capacity in the final polymerization reactor is decreased, the production efficiency is reduced. On the other hand, if the film thickness is increased to more than 0.15 mm, the reaction time in the final polymerization unit is lengthened, and thus the production efficiency is reduced. When the reaction is carried out under reduced pressure, if the pressure in the final polymerization reactor is maintained at not more than 5 mmHg and preferably not more than 1 mmHg, a polymer having a high instrinsic viscosity can be produced in a short time. When the reaction is carried out in an inert gas stream, if the amount of the inert gas, such as nitrogen gas, being introduced is set at not less than $0.4 X \times [\eta]^{-1}$ (m$^3$/min), the reaction is accelerated and proceeds rapidly. In the above formula, X indicates an amount of the oligomer supplied (kg/min).

In the polymerization in molten thin film form, since ethylene glycol by-produced is rapidly removed from the reaction system, de-ethylene glycol polycondensation resulting from polymerization of hydroxyl terminal groups with each other proceeds quickly, whereas esterification, i.e., a reaction between a carboxyl terminal group and a hydroxyl terminal group, proceeds relatively slowly. Thus in polymerization of the oligomer having a high carboxyl terminal group concentration, a polymer having a high intrinsic viscosity cannot be obtained because of the presence of residual carboxyl terminal group. Under the condition that the carboxyl terminal group concentration is the same, the hydroxyl terminal group concentration at an initial stage of polymerization is greater in an oligomer having a low intrinsic viscosity than in an oligomer having a high intrinsic viscosity. Thus, the esterification reaction of the carboxyl terminal group is easy to proceed and the residual carboxyl terminal group concentration becomes relatively low. In accordance with the process of the present invention, since an oligomer having an intrinsic viscosity [$\eta$] of not more than 0.4 dl/g and a carboxyl terminal group concentration [COOH] of not more than $90 \times [\eta]^{-0.4}$ μeq/g is used, a polymer having a high intrinsic viscosity can be obtained. In particular, if an oligomer having a carboxyl terminal group concentration [COOH] of not more than $20 \times [\eta]^{-0.4}$ μeq/g is used, a polymer having a high intrinsic viscosity can be easily produced. That is, in polymerization in a molten thin film form, if the carboxyl terminal group concentration [COOH] is decreased, polycondensation proceeds rapidly and, therefore, a decomposition reaction occurs only with difficulty. Accordingly, a polymer having a high intrinsic viscosity can be easily obtained, which in accordance with the conventional method, could be obtained by performing solid phase polymerization for a long time in order to proceed the polymerization while depressing a decomposition reaction after the molten polymerization.

The polymerization method of the present invention is described below in detail with reference to the accompanying drawings.

FIG. 1 is a cross-sectional view of one embodiment of an apparatus for use in polymerization under reduced pressure. An ester compound of terephthalic acid and ethylene glycol or an oligomer thereof is stored in a molten state in a tank 1. A molten substance supplied from the tank 1 is coated in a uniform thickness on an endless metallic belt 6 by means of a roller 2. The endless metallic belt 6 is heated while running between heating plates 3 and 3' with an inlet 4 and an outlet 5 for a heating medium, and is maintained at predetermined reaction temperature. The inside of a polymerization reactor unit 9 is maintained under reduced pressure by evacuation from a discharge outlet 12, and the above molten substance is completed in polycondensation while being maintained at predetermined temperature and pressure on the endless metallic belt 6. The polymer after completion of polycondensation on the endless metallic belt 6 is scraped in a molten state by means of a scraper 7 and removed from the reactor unit 9 by means of a gear pump 8 provided just below the scraper 7.

FIG. 2 is a cross-sectional view of one embodiment of an apparatus for use in polymerization in an inert gas stream. The starting material is supplied and polycondensated, and the final polymer is recovered in the same manner as in the embodiment of FIG. 1 except that an inert gas heated to the same temperature as that of a heating medium inlet 4 by means of an inert gas heater 10 is supplied through an inert gas inlet pipe 11 and discharged through an outlet 12.

The present invention is described below in greater detail with reference to the following examples, but the present invention should not be construed as being limited thereto.

In the examples, all parts are by weight.

EXAMPLE 1

Terephthalic acid and ethylene glycol were continuously fed to an esterification reactor where they were esterified, and the resulting ester compound was then sent to a polycondensation reactor where it was polycondensed to produce an oligomer having an intrinsic viscosity [$\eta$] of 0.15 dl/g and a carboxyl terminal group concentration [COOH] of 42 μeq/g. To 100 parts of this oligomer was added 0.05 part of antimony trioxide as a catalyst, and the resulting mixture was introduced into a final polymerization reactor shown in FIG. 1 and polymerized under conditions of reaction temperature of 295° C., pressure of 0.5 mmHg, amount of the oligomer supplied of 60 g/min, and film thickness of 0.015 mm for 1 minute. The polymer thus obtained was a polyester having an intrinsic viscosity [$\eta$] of 0.76 dl/g and having satisfactory color tone.

COMPARATIVE EXAMPLE 1

Terephthalic acid and ethylene glycol were continuously introduced in an esterification reactor where they were subjected to an esterification reaction. The resulting ester compound was polycondensed in a polycondensation reactor to produce an oligomer having an intrinsic viscosity [$\eta$] of 0.15 dl/g and a carboxyl terminal group concentration [COOH] of 302 μeq/g. To 100 parts of the above oligomer was added 0.05 part of antimony trioxide as a catalyst. The mixture was introduced into the final polymerization reactor shown in FIG. 1 where it was polymerized under conditions of reaction temperature of 295° C., pressure of 0.5 mmHg, amount of the oligomer supplied of 40 g/min, and film thickness of 0.01 mm for 1 minute. A polymer having an intrinsic viscosity [$\eta$] of 0.22 dl/g was obtained.

EXAMPLES 2 TO 21, AND COMPARATIVE EXAMPLES 2 TO 9

Polymerization of 100 parts of oligomers having various qualities with 0.05 part of antimony trioxide as a catalyst added thereto was conducted wherein polymerization conditions in the final polymerization reactor were changed as indicated. The intrinsic viscosity $[\eta]$ of each polymer thus produced is shown in Table 1. The acid value in Table 1 indicates the carboxyl terminal group concentration [COOH].

Comparative Examples 2 to 5 each demonstrates a case in which the oligomer having a high acid value was used.

Comparative Example 6 demonstrates a case in which the film thickness of the oligomer was too large.

Comparative Examples 7 to 9 each demonstrates a relation between oligomer having a high acid value and the film thickness.

EXAMPLE 22

Terephthalic acid and ethylene glycol were continuously fed to an esterification reactor where they were esterified, and the resulting ester compound was then polycondensed in a polycondensation reactor to produce an oligomer having an intrinsic viscosity $[\eta]$ of 0.15 dl/g and a carboxyl terminal group concentration [COOH] of 42 μeq/g. To 100 parts of this oligomer was added 0.05 part of antimony trioxide as a catalyst, and the mixture was introduced into a final polymerization reactor shown in FIG. 2 where it was polymerized for 1 minute under conditions of a reaction temperature of 295° C., a flow rate of heated nitrogen of 0.12 m³/min, an amount of the oligomer supplied of 40 g/min, and a film thickness of 0.015 mm. The polymer thus obtained was a polyester having an intrinsic viscosity $[\eta]$ of 0.7 dl/g, and had a good color tone.

COMPARATIVE EXAMPLE 10

Terephthalic acid and ethylene glycol were continuously fed to an esterification reactor where they were esterified, and the resulting ester compound was then pre-polycondensed in a polycondensation reactor to

TABLE 1

| | Oligomer | | | | Polymerization Condition | | | Recovered |
|---|---|---|---|---|---|---|---|---|
| | $[\eta]$ (dl/g) | Acid Value (μeq/g) | Amount supplied (g/min) | Film Thickness (mm) | Polymerization Temperature (°C.) | Pressure (mmHg) | Time (min) | Polymer $[\eta]$ (dl/g) |
| Example 2 | 0.15 | 42 | 20 | 0.005 | 295 | 0.5 | 1 | 0.91 |
| Example 3 | 0.15 | 42 | 40 | 0.01 | 295 | 0.5 | 1 | 0.87 |
| Example 4 | 0.15 | 42 | 80 | 0.02 | 295 | 0.5 | 1 | 0.69 |
| Example 5 | 0.15 | 42 | 80 | 0.03 | 295 | 0.5 | 1.5 | 0.73 |
| Example 6 | 0.15 | 42 | 100 | 0.05 | 295 | 0.5 | 2 | 0.70 |
| Example 7 | 0.13 | 8 | 20 | 0.005 | 295 | 0.5 | 1 | 1.02 |
| Example 8 | 0.13 | 8 | 40 | 0.01 | 295 | 0.5 | 1 | 0.90 |
| Example 9 | 0.13 | 8 | 60 | 0.015 | 295 | 0.5 | 1 | 0.81 |
| Example 10 | 0.13 | 8 | 80 | 0.02 | 295 | 0.5 | 1 | 0.71 |
| Example 11 | 0.13 | 8 | 80 | 0.03 | 295 | 0.5 | 1.5 | 0.74 |
| Example 12 | 0.13 | 8 | 100 | 0.05 | 295 | 0.5 | 2 | 0.72 |
| Example 13 | 0.32 | 11 | 40 | 0.01 | 295 | 0.5 | 1 | 0.98 |
| Example 14 | 0.32 | 11 | 120 | 0.03 | 295 | 0.5 | 1 | 0.76 |
| Example 15 | 0.15 | 42 | 60 | 0.015 | 310 | 0.5 | 1 | 1.10 |
| Example 16 | 0.15 | 42 | 120 | 0.03 | 310 | 0.5 | 1 | 0.84 |
| Example 17 | 0.15 | 42 | 200 | 0.05 | 310 | 0.5 | 1 | 0.67 |
| Example 18 | 0.13 | 8 | 20 | 0.005 | 310 | 0.5 | 1 | 1.37 |
| Example 19 | 0.15 | 8 | 40 | 0.01 | 320 | 0.5 | 1.5 | 2.31 |
| Example 20 | 0.15 | 8 | 80 | 0.02 | 320 | 0.5 | 3 | 1.64 |
| Example 21 | 0.15 | 88 | 200 | 0.05 | 320 | 0.5 | 20 | 2.20 |
| Comparative Example 2 | 0.15 | 302 | 20 | 0.005 | 295 | 0.5 | 1 | 0.23 |
| Comparative Example 3 | 0.15 | 302 | 100 | 0.05 | 295 | 0.5 | 2 | 0.35 |
| Comparative Example 4 | 0.14 | 133 | 20 | 0.005 | 295 | 0.5 | 1 | 0.46 |
| Comparative Example 5 | 0.14 | 133 | 100 | 0.05 | 295 | 0.5 | 2 | 0.48 |
| Comparative Example 6 | 0.15 | 42 | 100 | 0.3 | 295 | 0.5 | 12 | 0.41 |
| Comparative Example 7 | 0.15 | 302 | 40 | 0.01 | 320 | 0.5 | 1.5 | 0.37 |
| Comparative Example 8 | 0.15 | 302 | 40 | 0.01 | 320 | 0.5 | 5 | 0.39 |
| Comparative Example 9 | 0.15 | 302 | 200 | 0.05 | 320 | 0.5 | 20 | 0.44 |

In Table 1, Examples 2 to 6 each demonstrates a relation between the film thickness of the oligomer and the intrinsic viscosity $[\eta]$ of the recovered polymer.

Examples 7 to 12 each demonstrates a relation between the film thickness of oligomer having a low acid value and the intrinsic viscosity $[\eta]$ of the recovered polymer.

Examples 13 and 14 each demonstrates a case in which the oligomer having a high intrinsic viscosity $[\eta]$ was used.

Examples 15 to 18 each demonstrates a relation between the film thickness of the oligomer and the intrinsic viscosity $[\eta]$ of the recovered polymer at a relatively high polymerization temperature.

Examples 19 to 21 each demonstrates a relation between the oligomer having a low acid value and the polymerization time at a high polymerization temperature.

produce an oligomer having an intrinsic viscosity [η] of 0.15 dl/g and a carboxyl terminal group concentration [COOH] of 302 μeq/g. To 100 parts of the oligomer was was added 0.05 part of antimony trioxide as a catalyst, and the resulting mixture was introduced into a final polymerization reactor shown in FIG. 2, where it was polymerized for 1 minute under conditions of a reaction temperature of 295° C., a flow rate of heated nitrogen of 0.12 m³/min, an amount of the oligomer supplied of 40 g/min, and a film thickness of 0.01 mm. The polymer thus produced had an intrinsic viscosity [η] of 0.22 dl/g.

EXAMPLES 23 TO 33, AND COMPARATIVE EXAMPLES 11 TO 16

Polymerization of 100 parts of oligomers having various qualities with 0.05 part of antimony trioxide as a catalyst added thereto was conducted wherein polymerization conditions in a final polymerization reactor were changed as indicated. The intrinsic viscosity of each polymer thus obtained is shown in Table 2. The acid value in Table 2 indicates a carboxyl terminal group concentration [COOH].

Comparative Examples 13 and 14 each demonstrates a case in which the flow rate of $N_2$ was insufficient.

Comparative Example 15 demonstrates a case in which the film thickness of the oligomer was too large.

Comparative Example 16 demonstrates a case in which the oligomer having a high acid value was used.

EXAMPLE 34

Polymerization was carried out in the same manner as described in Example 1, except that a mixture of terephthalic acid and isophthalic acid (the weight ratio of terephthalic acid to isophthalic acid =9/1) was used instead of terephthalic acid, and the intrinsic viscosity [η] and the carboxyl terminal group concentration [COOH] of the oligomer produced were 0.15 dl/g and 40 μeq/g, respectively. A polymer recovered had an intrinsic viscosity [η] of 0.74 dl/g.

EXAMPLE 35

Polymerization was carried out in the same manner as described in Example 1, except that dimethylterephthalate was used instead of terephthalic acid for ester interchange reaction, and the intrinsic viscosity [η] and the

TABLE 2

|  | Oligomer | | | | Polymerization Condition | | | |
| --- | --- | --- | --- | --- | --- | --- | --- | --- |
|  | [η] (dl/g) | Acid Value (μeq/g) | Amount Supplied (g/min) | Film Thickness (mm) | Polymerization Temperature (°C.) | Flow Rate (m³/min) | Time (min) | Recovered Polymer [η] (dl/g) |
| Example 23 | 0.15 | 42 | 20 | 0.005 | 295 | 0.06 | 1 | 0.89 |
| Example 24 | 0.15 | 42 | 80 | 0.03 | 295 | 0.36 | 1.5 | 0.71 |
| Example 25 | 0.15 | 42 | 100 | 0.05 | 295 | 0.6 | 2 | 0.68 |
| Example 26 | 0.15 | 42 | 20 | 0.005 | 310 | 0.06 | 1 | 1.28 |
| Example 27 | 0.15 | 42 | 120 | 0.03 | 310 | 0.36 | 1 | 0.83 |
| Example 28 | 0.15 | 42 | 200 | 0.05 | 310 | 0.6 | 1 | 0.65 |
| Example 29 | 0.13 | 8 | 20 | 0.005 | 310 | 0.06 | 1 | 1.35 |
| Example 30 | 0.13 | 8 | 120 | 0.03 | 310 | 0.36 | 1 | 0.87 |
| Example 31 | 0.13 | 8 | 200 | 0.05 | 310 | 0.6 | 1 | 0.67 |
| Example 32 | 0.15 | 8 | 20 | 0.005 | 320 | 0.06 | 1.5 | 1.92 |
| Example 33 | 0.15 | 8 | 80 | 0.03 | 320 | 0.36 | 4 | 1.50 |
| Comparative Example 11 | 0.15 | 302 | 20 | 0.005 | 295 | 0.06 | 1 | 0.23 |
| Comparative Example 12 | 0.15 | 302 | 100 | 0.05 | 295 | 0.6 | 2 | 0.35 |
| Comparative Example 13 | 0.15 | 42 | 40 | 0.01 | 295 | 0.03 | 1 | 0.52 |
| Comparative Example 14 | 0.15 | 42 | 40 | 0.01 | 295 | 0.01 | 1 | 0.36 |
| Comparative Example 15 | 0.15 | 42 | 200 | 0.3 | 295 | 0.6 | 6 | 0.28 |
| Comparative Example 16 | 0.15 | 302 | 20 | 0.005 | 320 | 0.06 | 1.5 | 0.35 |

In Table 2, Examples 23 to 25 each demonstrates a relation between the film thickness of the oligomer and the intrinsic viscosity [η] of the recovered polymer.

Examples 26 to 28 each demonstrates a relation between the film thickness of the oligomer and the intrinsic viscosity [η] of the recovered polymer at a relatively high polymerization temperature.

Examples 29 to 31 each demonstrates the film thickness of the oligomer having a low acid value and the intrinsic viscosity [η] of the recovered polymer at a relatively high polymerization temperature.

Examples 32 and 33 each demonstrates a relation between the oligomer having a low acid value and the polymerization time at a high polymerization temperature.

Comparative Examples 11 and 12 each demonstrates a case in which the oligomer having a high acid value was used.

carboxyl terminal group concentration [COOH] of the oligomer produced were 0.14 dl/g and 6 μeq/g, respectively. A polymer recovered bad an intrinsic viscosity [η] of 0.82 dl/g.

While the invention has been described in detail and with reference to specific embodiments thereof, it will be apparent to one skilled in the art that various changes and modifications can be made therein without departing from the spirit and scope thereof.

What is claimed is:

1. A process for producing polyester comprising at least 80% of an ethylene terephthalate repeating unit using as a starting material an ester compound made mainly of terephthalic acid and ethylene glycol or an oligomer thereof, wherein an oligomer having an intrinsic viscosity [η] of not more than 0.4 dl/g and a carboxyl terminal group concentration [COOH] of not more than $90 \times [\eta]^{-0.4}$ μeq/g is fed to a final polymerization reactor and polymerized in an inert gas stream or under reduced pressure in the form of a molten thin film having a thickness of from 0.005 to 0.15 mm.

2. A process as in claim 1, wherein the starting material contains a third component.

3. A process as in claim 2, wherein the third component is a difunctional comonomer, a polyfunctional cross-linking agent, a monofunctional terminator, another type of polymer, a pigment, an ultraviolet absorber, a fluorescent whitening agent, or an insoluble nucleating agent.

4. A process as in claim 1, wherein the intrinsic viscosity $[\eta]$ of the oligomer is from 0.1 to 0.4 dl/g.

5. A process as in claim 1, wherein the carboxyl terminal group concentration [COOH] is not more than $20 \times [\eta]^{-0.4}$ μeq/g.

6. A process as in claim 1, wherein the flow rate of the inert gas is not less than $0.4X \times [\eta]^{-1}$ (m³/min), wherein X is an amount of the oligomer supplied (kg/min).

7. A process as in claim 1, wherein the pressure in the final polymerization reactor is not more than 5 mmHg.

8. A process as in claim 7, wherein the pressure in the polymerization reactor is not more than 1 mmHg.

9. A process as in claim 1, wherein the polymerization reaction temperature is from 240° to 330° C.

* * * * *